United States Patent

[11] 3,578,384

[72] Inventor Ludwig Leichtl
 Emmaus, Pa.
[21] Appl. No. 778,464
[22] Filed Nov. 25, 1968
[45] Patented May 11, 1971
[73] Assignee McCord Corporation
 Detroit, Mich.

[54] ADJUSTABLE HEADREST FOR VEHICLE SEATS
 16 Claims, 6 Drawing Figs.
[52] U.S. Cl. .................................................. 297/410,
 297/397
[51] Int. Cl. .................................................. A47c 7/36,
 A47c 7/42
[50] Field of Search ........................................ 297/1, 4,
 397—410; 248/411, 412

[56] References Cited
UNITED STATES PATENTS
3,159,427 1/1964 Lawson ..................... 297/410
3,467,352 9/1969 Bohler ........................ 248/412X Primary Examiner—Casmir A. Nunberg
Attorney—Barnes, Kisselle, Raisch & Choate ABSTRACT: A headrest for a vehicle seat wherein the cushioned headrest pad has one or more vertically depending support arms thereon which are vertically slideable in support brackets mounted within the seat cushion. Each support bracket is formed with a guideway for receiving the associated support arm. Each support bracket has a pair of inclined tabs thereon, an upper tab inclining upwardly and away from the guideway and a lower tab inclining downwardly and away from the guideway to form with an axially extending surface portion of the support arm a pair of acute angle cavities. Cylindrical members are arranged in the cavities to form friction wedges and springs are connected with the cylindrical members to urge them into tangential contact with the tabs and with the support arm so that vertical movement of the support arm is yieldably resisted by the frictional wedge action of spring-biased cylindrical members.

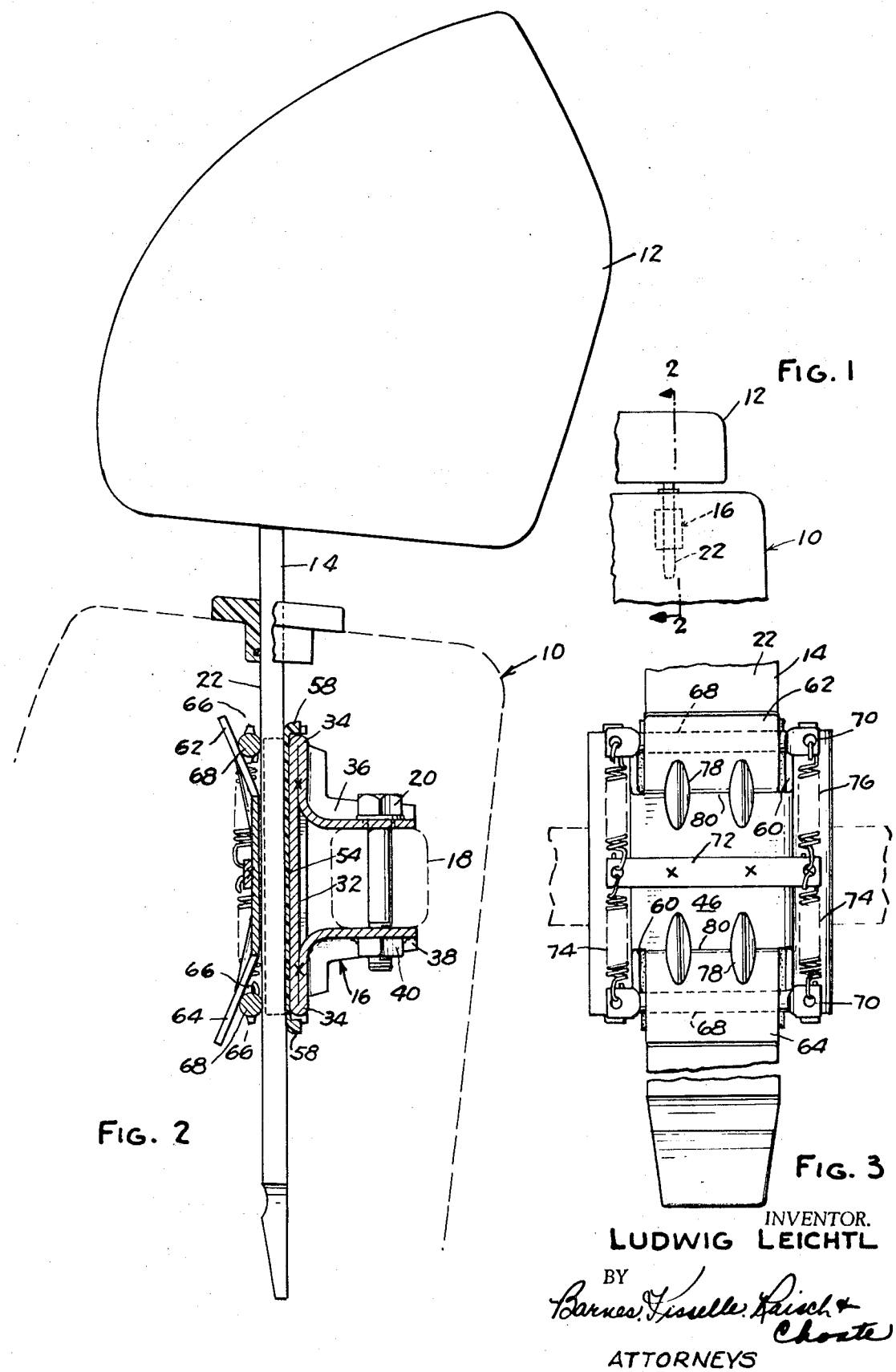

INVENTOR.
LUDWIG LEICHTL

BY
Barnes, Kisselle, Raisch & Choate

ATTORNEYS

ADJUSTABLE HEADREST FOR VEHICLE SEATS

This invention relates to an adjustable headrest for a vehicle seat.

It is an object of the present invention to provide a headrest construction which is of economical design from the standpoint of manufacture.

A further object of the invention resides in the provision of a headrest that is frictionally retained in its vertically adjusted position and which requires the exertion of a desired predetermined force to the headrest to shift it either upwardly or downwardly.

In the drawings:

FIG. 1 is a fragmentary elevational view of a vehicle seat back equipped with a headrest of the present invention.

FIG. 2 is an end elevational view with portions in section.

FIG. 3 is a fragmentary front elevational view of the headrest.

Figure 4:
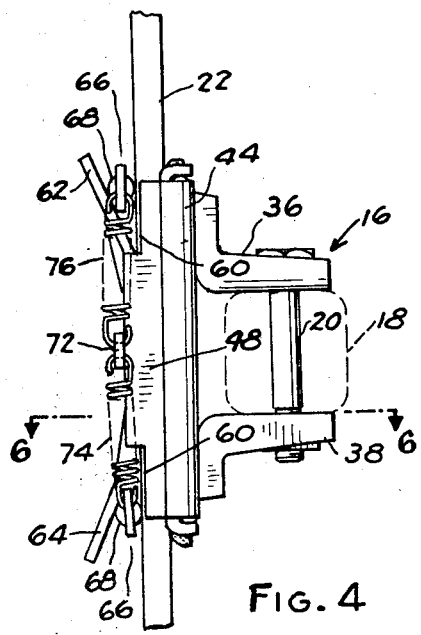
FIG. 4 is a fragmentary side elevational view of the headrest.
Figure 5:
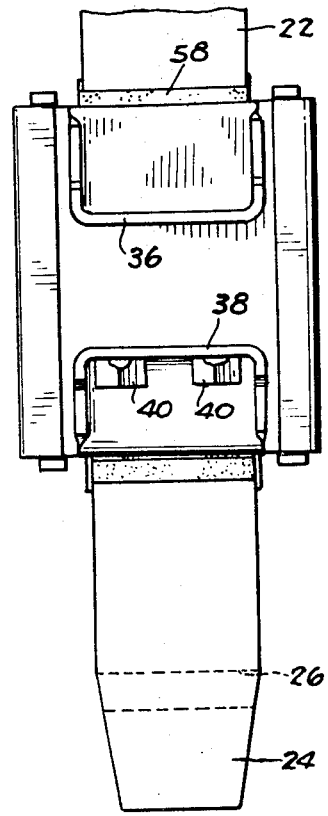
FIG. 5 is a fragmentary rear elevational view of the headrest.

In the drawings a conventional upholstered vehicle seat back is designated 10. The headrest of the present invention comprises a head cushioning pad 12, a support arm 14 rigidly secured to and depending from pad 12, and a support bracket 16 in which the support arm 14 is vertically slideable. Bracket 16 is designed to be mounted on a rigidly supported member 18 within the vehicle seat back by screws 20. In the arrangement illustrated only one support arm 14 is shown connected to pad 12. Normally each pad 12 will have a pair of laterally spaced support arms 14 connected thereto and two brackets 16 will be mounted within the seat back. Since the two support arms and their associated support brackets would be of identical construction, only one support arm 14 and one support bracket 16 will be described.

Figure 6:
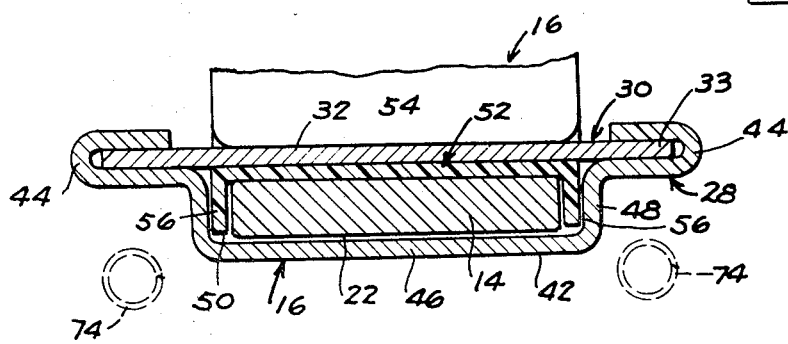
FIG. 6 is a sectional view along the line 6—6 in FIG. 4.

As is shown in FIG. 6, support arm 14 is of generally rectangular shape in cross section and the front face 22 thereof is a generally straight, flat, smooth surface. The lower end of arm 14 is slightly tapered as is indicated at 24. Immediately above the tapered portion 24 the front face 22 of support arm 14 is formed with a transversely extending rounded cavity 26.

Bracket 16 in the preferred embodiment illustrated comprises a pair of stampings 28 and 30 (FIG. 6). Stamping 30 includes a flat plate portion 32 which at its upper and lower ends is return bent as at 34, the return bent portions being formed as a pair of vertically spaced, flanged supports 36,38 which are adapted to straddle the upper and lower faces of supporting member 18 on the vehicle seat. The lower support 38 has a pair of nuts 40 welded thereto into which screws 20 are adapted to be tightened to rigidly mount bracket 16 on the seat.

The other stamping 28 which forms part of bracket 16 has a generally channel-shaped central portion 42 and has its side edge portions return bent as at 44 (FIG. 6) around the side edges of flat plate portion 32 of stamping 30. Thus, the side edge portions 33 of flat plate portion 32 are sandwiched between the return bent edge portions of stamping 28 and are welded thereto to make bracket 16 a unitary structure.

The central channel-shaped portion 42 is fashioned with a generally flat front wall 46 and a pair of vertically extending sidewalls 48. Front wall 46 and sidewalls 48 cooperate with flat plate portion 32 to form a generally rectangularly shaped guideway 50 for accommodating support arm 14. Within guideway 50 there is arranged a U-shaped bearing insert 52. Insert 52 is preferably molded from a wear-resistant, low friction, plastic material such as nylon or the like and has a flat rear wall 54 and vertically extending sidewalls 56. Adjacent its upper and lower ends insert 52 is formed with flanges 58 which are adapted to engage over the upper and lower return bent edges 34 of stamping 30 to retain insert 52 within guideway 50. Sidewalls 56 are spaced apart laterally a distance corresponding generally to the width of support arm 14 and the size of guideway 50 is such that the distance between the inner face of front wall 46 and the inner face of rear wall 54 is slightly greater than the thickness of support arm 14.

Adjacent its upper and lower edges front wall 46 is slotted vertically as at 60 to provide an upper tab 62 and a lower tab 64. As is shown in FIG. 2, tabs 62,64 are inclined outwardly at an acute angle to the axis of guideway 50 so as to form with the front flat face 22 of support arm 14 generally triangularly shaped cavities 66. Tabs 62 and the cavities formed thereby extend substantially across the full width of support arm 14. Within each cavity 66 there is arranged a transversely extending cylindrical steel rod 68. The outer ends of each rod 68 are flattened and apertured as at 70.

A transversely extending crossbar 72 is welded on the outer face of the front wall 46 at the vertically central portion thereof. A first pair of springs 74 have their lower ends engaged with the apertured ends 70 of the lower cylindrical rod 68 and have their upper ends anchored to the ends of crossbar 72. A second pair of springs 76 have their upper ends connected with the ends of the upper cylindrical rod 68 and have their lower ends anchored on crossbar 72. Thus, springs 74 and 76 urge the two cylindrical rods 68 into tangential contacting relation with their respective tabs and the front flat face 22 of support arm 14. Embossments 78 are formed on front face 46 to reinforce tabs 62,64 adjacent the bend lines 80.

The operation of the headrest mechanism described is apparent from the foregoing description. The action of springs 76 causes cylindrical rods 68 to be urged into generally wedging relation with the front face 22 of support arm 14 and the inner face of upper tab 62. This action effectively resists downward movement of the support arm 14 until a downward force is applied thereto which overcomes the frictional restraining action of the upper cylindrical rod 68. Likewise, lower springs 74 urge lower rod 68 upwardly into tight frictional wedging engagement with the front face 22 of support arm 14 and the inner face of the lower tab 64. This action resists movement of support arm 14 in an upward direction until the upward force applied to the arm is sufficient to overcome the frictional wedging action of lower rod 68.

It will be apparent that the force required to shift the headrest downwardly can be varied by varying the tension of springs 76 or the angle of inclination of tabs 62. Likewise, the force required to shift headrest 12 upwardly can be varied by varying the tension of springs 74 or the angle of inclination of tabs 64. In the arrangement illustrated tabs 62,64 are inclined to the axis of support arm 14 at an angle of slightly greater than 30°. This angle can vary appreciably and preferably lies in the range of about 25° to 40°. If it is desired that the force required to shift the headrest vertically downwardly be substantially equal to the force required to shift the headrest vertically upwardly then springs 76 would be designed to exert a somewhat greater tension than springs 74 in order to compensate for the weight of pad 12 and the support arms 14 connected thereto. This differential spring tension would be required because the weight of pad 12 and support arm 14 exerts an initial force acting in a direction tending to shift the headrest downwardly. Assume, for example, that a force of 80 pounds is desired to shift the headrest either upwardly or downwardly. If the headrest assembly weighs 10 pounds, then the upper rod 68 should be capable of resisting 90 pounds before the support arm 14 shifts downwardly while the lower rod 68 must be capable of resisting an upward force of 80 pounds before the headrest is shifted upwardly.

The tapered lower end portion 24 of support arm 14 facilitates initial insertion of the support arm into guideway 50. The transversely extending rounded cavity 26 adjacent the lower end of support arm 14 provides a safety feature in that, when support arm 14 is shifted upwardly to a position wherein the lower rod 68 is engaged within cavity 26, the wedging action is very substantially increased and it requires a considerably greater force to shift the headrest further in an upward direction. This prevents inadvertent separation of the headrest from its supporting bracket and also prevents such separation in the event of an impact where the seat back 10 might pivot forwardly so that the headrest itself would have a substantial forward and upward velocity component. Under such impact conditions the momentum of the headrest might be sufficient to overcome the normal restraining action of rod 68 when the rod bears against the flat front face 22 of support 14 but would prevent further outward or upward movement of the headrest when the lower rod 68 interengages with the cavity 26. Thus complete separation of the headrest from the seat and the possible injuries that might result therefrom are avoided.

I claim:

1. An adjustable headrest for a vehicle seat comprising a support bracket adapted to be attached to a support member located internally within an upholstered seat back cushion, means on said support bracket forming a vertically extending guideway thereon, a headrest support arm vertically slideable in said guideway, said guideway forming means including a pair of generally flat faces which are inclined to the axis of the guideway, one of said faces being inclined upwardly and away from the guideway and the other face being inclined downwardly and away from the guideway, each of said faces forming an acute angle cavity with an axially extending face portion of the support arm, a wedge member in each of said cavities extending transversely of the axis of the support arm and laterally outwardly beyond the opposite vertical side edges of said inclined faces, spring anchor means at the opposite ends of said wedge members, spring anchor means fixed on said support bracket and vertically offset from said inclined faces, individual springs extending between and interconnected with the spring anchor means on each end of each wedge and the anchor means on said bracket for biasing each of said wedge members into frictional engagement with said face portion of the support arm and the inclined face of the associated cavity whereby movement of the support arm vertically upwardly is yieldably resisted by one of said wedge members and movement of the support arm vertically downwardly is yieldably resisted by the other wedge member.

2. A headrest as called for in claim 1 wherein said inclined faces are spaced apart axially of said guideway, one adjacent the upper end thereof and one adjacent the lower end thereof.

3. A headrest as called for in claim 2 wherein the upper inclined face inclines upwardly and away from the guideway and the lower inclined face inclined downwardly and away from the guideway.

4. A headrest as called for in claim 1 wherein said faces are inclined to the axis of the guideway at an angle of between about 25° and 40°.

5. A headrest as called for in claim 1 wherein the springs connected with one of said wedge members are adapted to exert a biasing force on said one wedge member which is different in magnitude from the biasing force exerted on the other wedge member by the springs connected with the latter wedge member.

6. A headrest as called for in claim 3 wherein the spring anchor means on said bracket are located vertically intermediate said upper and lower inclined faces and said springs comprise tension springs.

7. An adjustable headrest for a vehicle seat comprising a support bracket adapted to be fixedly mounted on the vehicle seat, said support bracket having a pair of spaced-apart vertically extending sidewalls and spaced-apart vertically extending front and back walls which cooperate to define a generally rectangularly shaped vertically extending guideway, the upper end portion of one of said walls having a tab thereon which inclines upwardly and away from the guideway, the lower end of one of said walls having a tab thereon which inclines downwardly and away from the guideway, a headrest support arm slideable vertically in said guideway, said support arm being shaped in cross section to correspond generally with the cross-sectional shape of said guideway and having generally flat axially extending face portions cooperating with said tabs to form a pair of acute-angle cavities therewith, a wedge member in each of said cavities and means biasing each of said wedge members into frictional engagement with its associated tab and the adjacent flat face portion of the support arm.

8. A headrest as called for in claim 7 wherein said tabs are formed on the same wall of the bracket.

9. A headrest as called for in claim 8 including a channel-shaped bearing insert in said guideway, said insert engaging three walls of said guideway and being open at the face thereof juxtaposed to the wall of the guideway having said tabs thereon.

10. A headrest as called for in claim 7 wherein said tabs incline to the axis of the guideway at an angle of between about 25° to 40°.

11. A headrest as called for in claim 7 wherein said wedge members are of cylindrical shape.

12. A headrest as called for in claim 7 wherein said biasing means comprise springs connected with each of said wedge members.

13. A headrest as called for in claim 7 wherein said biasing means comprises a first pair of tension springs connected between said bracket and one of said wedge members and a second pair of tension springs connected between said bracket and the other wedge member.

14. A headrest as called for in claim 13 wherein one of said pair of springs is stronger than the other pair of springs.

15. A headrest as called for in claim 14 wherein the pair of springs connected with the wedge member in the upper cavity is stronger than the pair of springs connected with the wedge member in the lower cavity.

16. A headrest as called for in claim 7 wherein said support arm has a transversely extending groove adjacent the lower end thereof in said face portion thereof associated with the lower cavity and into which the wedge member in the lower cavity is adapted to seat upon movement of the support arm upwardly to a predetermined position.